United States Patent [19]

Payne

[11] Patent Number: 5,238,379
[45] Date of Patent: Aug. 24, 1993

[54] MOLDING AND ASSEMBLING APPARATUS

[76] Inventor: LeRoy Payne, 3300 Nicholas La., Molt, Mont. 59057

[21] Appl. No.: 950,169

[22] Filed: Sep. 24, 1992

Related U.S. Application Data

[60] Division of Ser. No. 692,917, Apr. 29, 1991, Pat. No. 5,173,221, and a continuation-in-part of Ser. No. 417,502, Oct. 5, 1989, Pat. No. 5,022,838, said Ser. No. 692,917, is a continuation-in-part of Ser. No. 495,621, Mar. 19, 1990, Pat. No. 5,011,636, which is a continuation-in-part of Ser. No. 271,717, Nov. 16, 1988, Pat. No. 4,909,718, said Ser. No. 417,502, is a continuation-in-part of Ser. No. 271,686, Nov. 16, 1988, Pat. No. 4,956,133, which is a continuation-in-part of Ser. No. 202,267, Jun. 6, 1988, Pat. No. 4,956,135, which is a continuation-in-part of Ser. No. 890,742, Jul. 30, 1986, Pat. No. 4,749,753, which is a division of Ser. No. 766,498, Aug. 19, 1985, Pat. No. 4,671,753, said Ser. No. 271,717, is a continuation-in-part of Ser. No. 202,267, Aug. 19, 1985, which is a continuation-in-part of Ser. No. 890,742, Aug. 19, 1985, which is a division of Ser. No. 766,498, Aug. 19, 1985.

[51] Int. Cl.⁵ .............................................. B29C 41/04
[52] U.S. Cl. .................................... 425/135; 425/150; 425/435
[58] Field of Search ............... 425/4 R, 4 C, 135, 145, 425/150, 425, 434, 435, 817 R, 817 C, 253, DIG. 241; 264/34, 39, 40.1, 40.2, 40.5, 40.7, 45.5, 45.7, 311, 349, DIG. 14, DIG. 17

[56] References Cited

U.S. PATENT DOCUMENTS

| | | | |
|---|---|---|---|
| 4,043,721 | 8/1977 | Lemelson | 425/4 R X |
| 4,051,209 | 9/1977 | Tabler | 264/39 |
| 4,285,903 | 8/1981 | Lemelson | 264/45.7 X |
| 4,389,177 | 6/1983 | Colby | 425/435 X |
| 4,560,335 | 12/1985 | Cordova et al. | 425/435 X |

Primary Examiner—Richard L. Chiesa
Attorney, Agent, or Firm—Arthur L. Urban

[57] ABSTRACT

Mobile structural unit molding and assembling apparatus includes a support portion, a raw material supplying portion, a molding portion, a unit transferring portion and a control portion. The support portion includes at least one base section with a wheeled carriage. The raw material supplying portion includes a plurality of reservoirs disposed on the base section. The molding portion includes at least one rotatable mold assembly disposed on the base section including at least two separable mold sections. A mixing chamber adjacent the mold assembly connects with raw material reservoirs through independent conduits. The unit transferring portion includes a tiltable unit positioning assembly selectively movable with respect to the molding portion. The control portion includes a programmable memory, a coordinator, sensors, actuators, a unit orienter and circuitry therefor. A continuous structural unit molding and assembling method includes the steps of flowing a freshly formed resin forming mixture over all surfaces of a mold cavity by multiaxis rotation to form a structural unit, conveying the unit not fully cured, orienting the unit in an inclined orientation, and assembling it with previously positioned units, and the resulting structure.

10 Claims, 1 Drawing Sheet

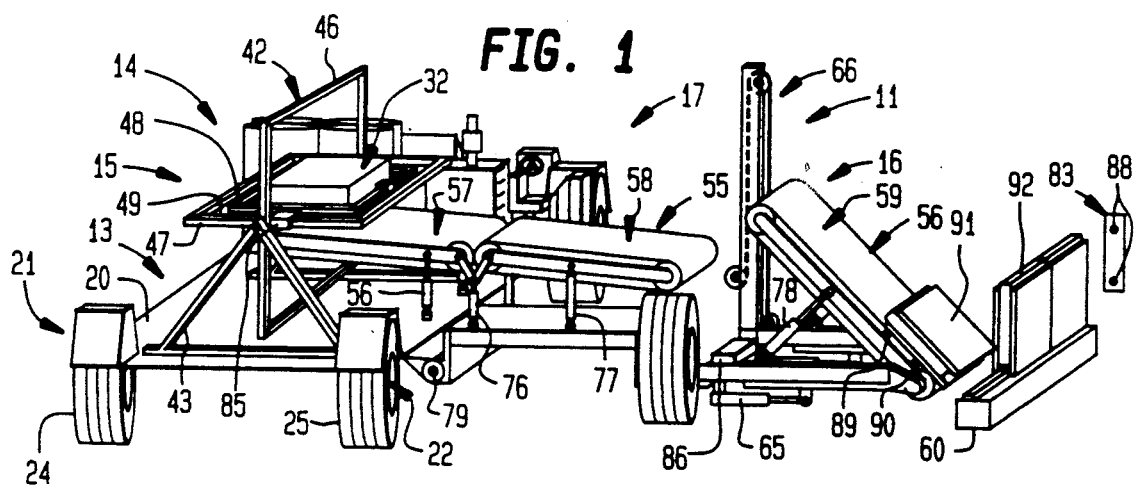
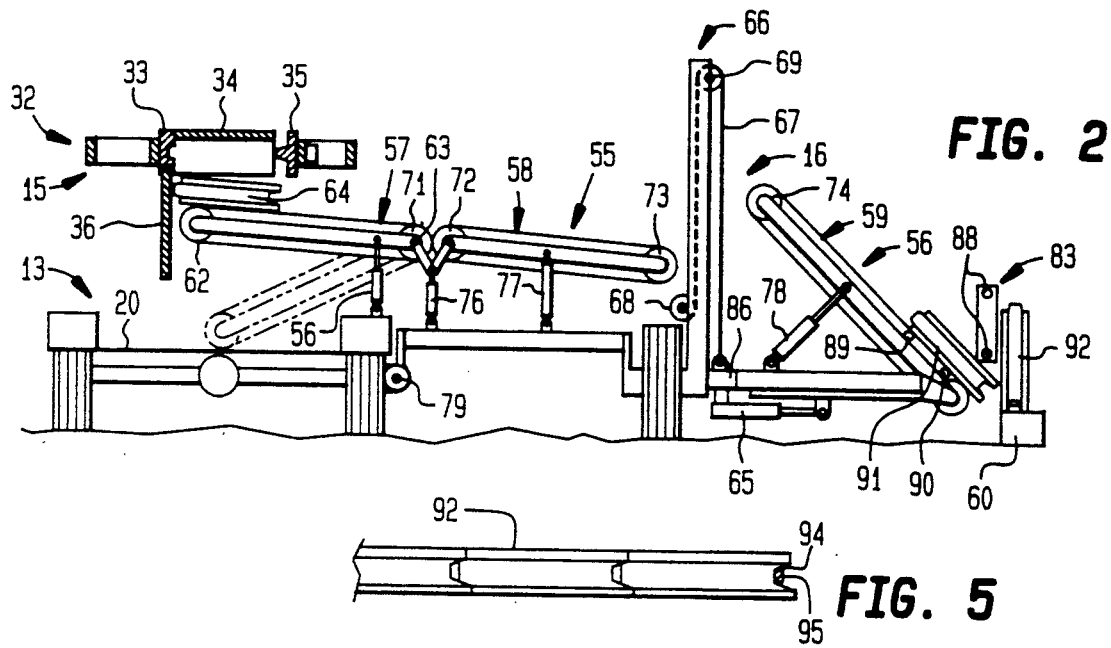
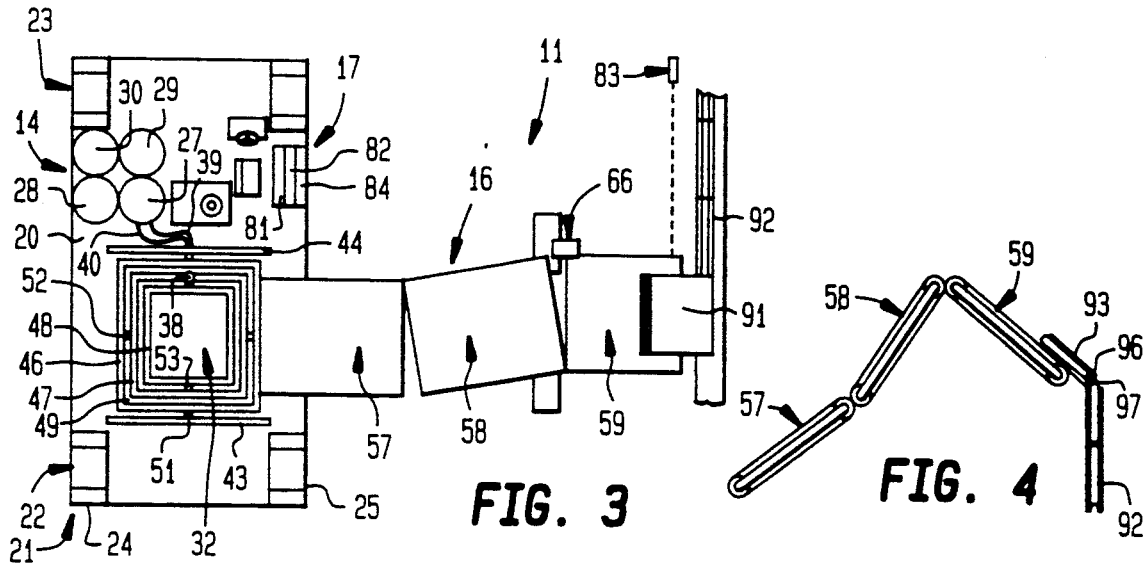

MOLDING AND ASSEMBLING APPARATUS

This application is a division of Ser. No. 692,917 filed Apr. 29, 1991, now U.S. Pat. No. 5,173,221, which is a continuation-in-part of pending application Ser. No. 495,621, filed Mar. 19, 1990, now U.S. Pat. No. 5,011,636, which in turn is a continuation-in-part of application Ser. No. 271,717, filed Nov. 16, 1988, now U.S. Pat. No. 4,909,718. This application also is a continuation-in-part of pending application Ser. No. 417,502, filed Oct. 5, 1989, now U.S. Pat. No. 5,022,838, which in turn is a continuation-in-part of application Ser. No. 271,686, filed Nov. 16, 1988, now U.S. Pat. No. 4,956,133. Both Ser. Nos. 271,717 and 271,686 in turn are continuations-in-part of application Ser. No. 202,267, filed Jun. 6, 1988, now U.S. Pat. No. 4,956,135, which in turn is a continuation-in-part of application Ser. No. 890,742, filed Jul. 30, 1986, now U.S. Pat. No. 4,749,533, which is a division of application Ser. No. 766,498, filed Aug. 19, 1985, now U.S. Pat. No. 4,671,753.

This invention relates to a novel apparatus and new method for molding and assembling units to form structures.

Throughout history, an important activity has been the construction of buildings for various purposes such as dwellings, storage and the like. With primitive societies, it was common to construct such buildings from natural materials that were readily available. In forested areas, structures were erected with logs or boards that had been cut from the logs.

Where trees were less common, people used stone for building materials or artificial adobe substitutes formed from mud baked in the sun. To make artificial stones or bricks more durable and less likely to crumble, it was customary to mix straw or similar materials with the mud. The building components ordinarily were fabricated and/or prepared at the building site.

Even today most building construction is performed at the building site using components and materials trucked to the site from other locations. These building methods require that a large number of different craftsmen do their work at the construction site. Thus, the quality of the finished building depends upon the ability of the craftsmen to perform their tasks properly under the conditions and distractions generated by the activities of the many other workmen on the site at the same time.

Efforts have been directed to the use of prefabricated modules produced at central locations and trucked to the building site for assembly. However, this type of construction has gained only limited acceptance because of the lack of flexibility in building designs, the module size limitations and the high cost of transporting modules over the highways.

To overcome the shortcomings of traditional construction procedures, the renowned architect, Frank Lloyd Wright and his associates, more than a half century ago, pioneered Usonian block houses fabricated with cast hollow concrete blocks. The blocks are formed with grooves around their edges so they can be interconnected with mortar and steel reinforcing bars like giant children's building blocks. The interconnected blocks can be used to span openings, contain utility services, accommodate glass, doors and the like. This system enables an owner and/or small crew to construct a building without an army of special craftsmen such as masons, carpenters, etc.

The blocks can be fabricated at the building site in simple molds. The block system is based on modular units generally two to four feet in width. Great care must be exercised in the assembly of the blocks to ensure that the joints follow the module dimensions. Any cumulative incremental error eventually may disrupt the modular structure. Thus, the dimensions of the individual blocks have to be maintained within very close tolerances which is difficult to achieve with the inherent shrinkage that occurs during the molding of the blocks and the curing thereof with time.

From a practical viewpoint, the collection of a sufficiently large number of blocks of exactly the same dimensions for an entire building including the roof, walls, floors and partitions is a formidable task. One must be willing to make a much larger number of blocks than needed and then inspect each carefully, discarding the many blocks that do not meet specifications.

Even when tolerable dimensional reproducability is achieved, the high strength and structural uniformity required for building quality, durability and integrity still must be maintained.

Earlier patent application Ser. Nos. 271,717 and 495,621 above are directed to novel structural units which have a high level of strength and uniformity of size that meet dimensional and structural specifications easily. The units also include peripheral edges which can be interlocked to facilitate assembly. The structural integrity of buildings erected from such units however will depend to a considerable extent upon the care, skill and experience of the persons assembling the units.

The present invention provides a novel mobile apparatus and method which combines the molding and assembly of structural units into an integrated operation. Moreover, the molding and assembly are performed automatically with a minimum of hand labor. Furthermore, the apparatus and method of the invention provide a high degree of design flexibility as well as construction efficiencies.

The molding and assembling apparatus of the present invention is relatively simple in design and can be produced at moderate cost. Commercially available materials and components can be utilized in its construction. Also, conventional metal fabricating techniques and procedures can be employed in the manufacture of the apparatus.

The molding and assembling apparatus and method of the invention can be adapted to mold and assemble a wide variety of different structural units. Thus, foundation units, wall units, window units, corner units, floor units, ceiling units, roof units, solar units and the like can be molded and assembled successfully with the method and apparatus of the invention.

Variations in configuration, function, structure, composition, etc. can be attained simply and quickly with the method and apparatus of the invention. Even with such variations, uniformity of dimensions, composition and quality can be maintained without difficulty.

Structural units can be molded and assembled to form buildings and other structures of many different designs rapidly and with precision. The apparatus and method of the invention enable the structural units to be molded and assembled in modules precisely without mortar and without continuous checking of alignment and orientation as each unit is added. Subsequent modification or alteration of a building can be made if desired.

BRIEF DESCRIPTION OF THE DRAWING

These and other benefits and advantages of the novel mobile structural unit molding and assembling apparatus and method of the present invention will be apparent from the following description and the accompanying drawings in which:

FIG. 1 is a view in perspective of one form of mobile structural unit molding and assembling apparatus of the invention in use;

FIG. 2 is an enlarged fragmentary side view partially in section of the molding and assembling apparatus shown in FIG. 1;

FIG. 3 is a reduced top view of the molding and assembling apparatus shown in FIG. 1;

FIG. 4 is a schematic illustration of a side view of the apparatus of the invention assembling an upper tier of structural units; and FIG. 5 is a top view of assembled structural units of the invention.

DESCRIPTION OF THE PREFERRED EMBODIMENTS

As shown in the drawings, one form of mobile structural unit molding and assembling apparatus 11 of the present invention includes a support portion 13, a raw material supplying portion 14, a molding portion 15, a unit transferring portion 16 and a control portion 17.

The support portion 13 of the molding and assembling apparatus 11 of the invention includes at least one base section 20. Carriage means 21 depending from base section 20 includes at least one transverse axle assembly 22, and advantageously more than one axle assembly shown as axle assemblies 22 and 23. Wheels 24 and 25 are mounted on free ends of each axle.

The raw material supplying portion 14 of the molding and assembling apparatus 11 includes a plurality of reservoirs 27, 28, 29 and 30 disposed on the base section 20. These reservoirs may include storage chambers for resin forming materials, fillers, reinforcements, colors, catalysts, foam forming materials, other additives, premixed inert mixtures thereof and the like.

The molding portion 15 of the apparatus 11 of the invention includes at least one rotatable mold assembly 32 disposed on the base section. The mold assembly 32 includes at least two separable mold sections and advantageously a plurality of mold sections shown as sections 33, 34, 35 and 36.

The molding portion 15 also includes a mixing chamber 38. The mixing chamber 38 is disposed adjacent the mold assembly 32 and preferably closely adjacent thereto. The mixing chamber 38 is connected with the raw materials reservoirs 27-30 through independent conduit means 39 (one of which is shown in FIG. 3). Preferably, separate bypass return conduit means 40 (one of which is shown) extend from one end of each conduit adjacent the mixing chamber 38 back to the respective reservoir.

The molding portion 15 advantageously includes a frame assembly 42 to effect rotation of mold assembly 32 about more than one axis. The frame assembly preferably includes parallel upstanding end sections 43 and 44 with a plurality of independently rotatable frame members shown as frames 46, 47 and 48 extending therebetween. Each frame member includes a large open central area 49. Each inner frame member is progressively smaller in size and is disposed within an open central area of the next larger frame member.

Alternate frame members 46 and 48 advantageously as shown are rotatable about aligned axes 51 and 53. The frame member 47 therebetween is rotatable about an axis 52 generally perpendicular to the aligned axes 51 and 53. The smaller frame members generally are centered within the open central area of the next larger frame member, that is, frame 48 inside 47 and frame 47 inside 46.

The frame members preferably are of a generally multiangular configuration. The frame members advantageously are formed of tubing, most preferably with a quadrangular, e.g. square cross section. It is desirable for the raw material conduits and the electrical conductors energizing frame drive means to be disposed along the frame members.

The unit transferring portion 16 of the molding and assembling apparatus 11 of the present invention advantageously includes movable conveying means 55, preferably including endless belts 56. Advantageously, the unit transferring portion includes a plurality of conveying sections 57, 58 and 59 arranged in a generally end-to-end relationship. The conveying sections 57-59 preferably form a substantially continuous path from the molding portion 15 to a unit placement position 60.

The movable conveying means 55 advantageously includes an end 62 adjacent the molding portion 15 that is movable from a position spaced from the mold assembly 32 during rotation thereof to a position closely adjacent to the mold assembly when rotation thereof ceases. Thus, as shown in FIG. 2 of the drawings, end 62 of conveying section 57 which pivots about point 63 is disposed in a lowered position during rotation of the mold assembly and is moved to a raised position with piston 56 when rotation ceases and pivotable mold section 36 is lowered. Separating end mold sections 33 and 35 allows a freshly molded structural unit 64 to drop onto the raised end of conveying section 57.

The unit transferring portion 16 of the molding and assembling apparatus 11 includes a tiltable unit positioning assembly shown as conveying section 59. The unit positioning assembly is selectively movable with respect to the molding portion 15.

The tiltable unit positioning assembly (section 59) which is remote from the molding portion advantageously includes extending means shown as piston 65 and elevating means 66 shown as chain 67 and sprockets 68, 69. Adjacent ends 71, 72 and 73, 74 of the conveying sections 57, 58 and 59 preferably are maintained in close proximity through suitable means such as pistons 76, 77 and 78. It is desirable that the unit transferring portion 16 be pivotable with respect to support portion 13 about point 79.

The control portion 17 of the molding and assembling apparatus 11 of the invention includes programmable memory means 81, coordinating means 82, sensing means 83, actuating means 84, multi-axis mold rotating means 85, unit orienting means 86 and appropriate circuitry interconnecting same. The coordinating means 82 preferably automatically controls the unit molding and assembly operations.

The sensing means 83 advantageously may include a laser beam generator 88 directed along a line on which the units are being assembled. Receivers 89 and 90 may be located adjacent each end of the tilting conveying section 59 to sense when the unit moving on the conveyor is in a correct orientation for positioning and assembly with other units.

The control portion 17 of the apparatus 11 also includes a plurality of pumps, valves, monitors and the like. Advantageously, a pump, a valve and a flow monitor are located along the length of each conduit 39 that extends between the raw material reservoirs 27-30 and the mixing chamber 38.

In addition, the control portion includes a plurality of drive means (not shown). Drives provide independent rotation of each frame member 46-48. Other drives provide separation of the mold sections 33-36.

Advantageously, the coordinating means 82 includes a process controller that initiates changes in the flows of materials and speeds of drives to bring variations therein back to the rates specified in the programs present in the memory 81. This coordination commonly is achieved through the transmission of information such as digital pulses from the monitors and/or sensors at the control components to the process controller. The operating information is compared with the preselected programming parameters stored in the memory. If differences are detected, instructions from the controller change the operation of the components to restore the molding operation to the preselected processing specifications.

Novel molded structural units may be formed using the molding and assembling apparatus 11 shown in the drawings employing the following steps of the molding and assembling method of the invention. With the design of the desired unit and the location of the mateable peripheral sections thereof established, the control portion 17 including memory 81 which may be a computer, is programmed with the necessary processing parameters for the particular unit being molded and the structure being formed therewith.

The apparatus 11 is moved to a location at which the preselected structure is to be formed and generally aligned alongside the position of one wall. Then, the laser beam generator 88 is focused along the line of the wall to be constructed.

To begin the operation of the apparatus 11, buttons and/or switches (not shown) are depressed to activate the memory 81 and the other components of the control portion 17. The coordinating means 82 energizes drives to lock the mold sections together and the drives for rotation of each frame member 46-48.

Also, the pumps, the valves and the flow monitors (not shown) are energized by the coordinating means 82 in the preselected sequences of the program stored in the memory. This causes the raw materials in reservoirs 27-30 to advance along the conduits 39 toward the mixing chamber 38. For example, to mold a product including a foamed polyurethane resin, reservoir 27 may contain a previously prepared mixture of an isocyanate and gravel as a filler, reservoir 28 a polyol, 29 foam forming materials and 30 and other reservoirs (not shown) —colors, catalysts, etc. as required.

For the production of a high quality molded structural unit of the invention, it is important that the raw materials delivered to the mixing chamber be uniform in volume and composition. This can be facilitated by providing a continuous flow of raw materials to the mixing chamber 38 and the immediate transfer of the mixture therefrom into the mold cavity. However, the volume of the mixture delivered into the mold cavity will vary depending upon the particular incremental area of the cavity being coated at any instant. Also, the delivery will be terminated completely when a molded unit 64 is being removed from the mold assembly 32.

Advantageously, as shown in FIG. 3, a separate bypass conduit 40 is utilized from the end of each conduit 39 at a point adjacent the mixing chamber 38 back to the respective reservoir 27-30. This construction provides a freshly formed uniform mixture into the mold cavity even though the distance is considerable between the reservoirs and the mixing chamber which is located closely adjacent or even within the mold assembly 32.

The control portion 17 coordinates the operation of the various system components so the required formulation can flow into the desired zones within the rotating mold cavity. After the desired volume of the mixture has passed into the mold cavity, rotation of the frame members 46-48 is continued to flow the mixture over all surfaces of the mold cavity in a preselected and monitored rotational profile.

The rotations are controlled within the parameters stored in the memory 81. For particular structural units, the rotations about the respective axes may be continuous and/or intermittent at changing rates. Also, it may be desirable to provide arcuate rotation, that is, movement about an arch such as a rocking motion.

The components of the liquid mixture that flow into the mold cavity quickly begin to react to form a thermosetting resin structure while rotational movement of the mold assembly 32 continues about several axes. The mixture initially spread over the mold interior forms a resin structure with a high density and with little or no bubble formation. This dense structure includes primary structural components of the structural unit, that is, face sections, frame sections, connector members, etc. and usually a thin shell on other portions of the unit being molded. It is customary, however, to add to the mold cavity a second formulation that includes a significant proportion of a foam-forming ingredient to form a less dense resin foam within the remaining areas of the unit.

To provide structural units of the invention which are receptive to environmental conditions such as light, heat, cold, etc., transparent and translucent panels and other components can be formed during the molding either prior to, simultaneously with or subsequent to the formation of the primary structural components discussed above.

When all of the desired parts of the unit have been molded, rotation of the mold assembly 32 is stopped, the mold section 36 lowered and end 62 of conveying section 57 is raised close to the molded unit 64. Then, mold sections 33-35 are separated allowing the unit to drop onto the conveyor 57.

As the end 62 of conveyor 57 is being raised with piston 56, elevating means 66 is raising or lowering conveyor 59 into an appropriate position to assemble the next molded unit. Simultaneously, pistons 76 and 77 move conveyor ends 71, 72 and 73, 74 into proper elevation to provide a continuous path for the movement of the freshly molded unit along conveyors 57, 58 and onto tiltable positioning conveyor 59.

When the structural unit reaches the conveyor 59, pistons 65 and 78 and orienting means 86 associated with the unit positioning assembly are activated to move the unit into position for assembly with other units 92. As inclined unit 91 interrupts a lower beam being emitted from sensing means 83, this information is transmitted to memory 81. Movement of the unit 91 is continued until receiver 90 becomes aligned with the lower beam. At this point, the lowest edge of the inclined unit 91 is oriented with the corresponding edge of adjoining unit 92 for assembly therewith.

Piston 78 then raises conveyor 59 and unit 91 thereon into a more vertical position. Raising of conveyor 59 causes the unit to break the beam from upper generator 88 and movement is continued until receiver 89 is aligned with the upper beam. The unit 91 now is tightly assembled to units 92. The unit positioning assembly including conveyor 59 then is withdrawn by the reversal of piston 65.

FIG. 4 illustrates the disposition of conveyors 57 and 58 to facilitate assembly of an upper tier of units on top of previously positioned units. As shown, conveyors 57 and 58 moved a molded unit upwardly from a molding assembly (not shown) to conveyor 59 which has been moved to a raised position by elevating means such as 66 shown in the other figures.

FIG. 5 illustrates a fragmentary assembly of structural units viewed from above. As shown, the edges of the units are sculptured to permit left to right assembly of each unit in close engagement with units previously positioned. The particular edge configuration will be dependent upon the specific use of the structural units. If desired, a resilient spacing material may be inserted between adjacent structural units during assembly. Such spacing may be appropriate when the mass of each structural unit is large and considerable temperature variations are anticipated in service.

With the configuration shown in FIG. 5, a vertical passage 94 is formed between adjacent units. A reinforcing beam or rod 95 may be inserted along the passage. In FIG. 4, a reinforcing rod 97 has been inserted into a horizontal opening 96 between units prior to tilting unit 93 into a vertical position aligned with units 92. Intersecting rods between units may be joined to form an integral reinforcing network if desired. Alternatively, or in addition, passages 94 and 96 may be filled with a resin forming material similar to that employed in the molding of the units.

The structural unit 64 leaving mold assembly 32 has structural integrity and is not fully cured. Advantageously, edges of each unit are adhesive. Curing of the unit continues as the unit moves along the conveyors and is assembled with other units to form the desired structure. During this period, the final expansion of the unit, free of the mold's restraint, stresses the high density outer skin or layer of the unit. This stressing of the skin increases the strength and puncture resistance thereof and also the structural strength of the unit itself.

The structural strength of the unit can be enhanced further by including a reinforcement such as metal or fiberglass fibers in the mixture prior to molding. Also, preformed reinforcements such as metal rods can be positioned in the mold cavity before the mold sections are closed.

Other properties of the structural unit may be modified by selective choice of raw materials and components. For example, heat and/or combusion resistance may be improved by the use of phenolic resin forming materials. Also, the appearance and texture of the major surfaces of the structural units can be chosen to simulate smooth or rough wood, split shakes, stone, tile, etc. as well as original designs, murals and the like.

The molding and assembling apparatus and method of the invention can be modified to accommodate particular structural units, assembly requirements and erection sites. The various portions of the apparatus can be separated or consolidated as required.

The above description and the accompanying drawings show that the present invention provides a novel structural unit molding and assembling apparatus and method with features and advantages not previously available. The molding and assembling operations are integrated to provide a high degree of design flexibility and construction efficiencies.

The molding and assembling are accomplished automatically with a minimum of hand labor. The method and apparatus can be adapted to mold and assemble the wide variety of structural units required and desired to construct buildings and other structures of many different designs.

The apparatus and method of the invention accomplished above without sacrificing uniformity of dimensions, composition and quality. The apparatus can be manufactured with readily available materials and components employing conventional fabricating techniques.

It will be apparent that various modifications can be made in the particular apparatus, method and product described in detail and shown in the drawings within the scope of the present invention. The size, configuration and arrangement of components of the apparatus and product can be changed to meet specific requirements. Also, raw materials and method steps can be added or eliminated as required.

These and other changes can be made in the method, apparatus and product of the invention provided the operation and functioning thereof are not adversely affected. Therefore, the scope of the present invention is to be limited only by the following claims.

What is claimed is:

1. Mobile structural unit molding and assembling apparatus including a support portion, a raw material supplying portion, a molding portion, a unit transferring portion and a control portion; said support portion including at least one base section, carriage means depending from said base section including at least one transverse axle assembly, wheels mounted on free ends of the axle assembly; said raw material supplying portion including a plurality of reservoirs disposed on said base section; said molding portion including at least one rotatable mold assembly disposed on said base section, said mold assembly including at least two separable mold sections, a mixing chamber adjacent said mold assembly, said mixing chamber being connected with said raw material reservoirs through independent conduit means; said unit transferring portion including a tiltable unit positioning assembly selectively movable with respect to said molding portion; said control portion including programmable memory means, coordinating means, sensing means, actuating means, unit orienting means and circuitry transmitting signals from said sensing means to said coordinating means for comparison with said memory means and activation of said actuating means to rotate said mold assembly in a preselected multi-axis rotational profile, to move said unit positioning assembly to preselected positions remote from said mold assembly and to orient said unit positioning assembly to place units at preselected positions in repeating unit molding and positioning cycles according to a preselected program for assembly of a multiplicity of units forming a structure.

2. Mobile structural unit molding and assembling apparatus according to claim 1 wherein said unit transferring portion includes movable conveying means.

3. Mobile structural unit molding and assembling apparatus according to claim 2 wherein said conveying means includes endless belt means.

4. Mobile structural unit molding and assembling apparatus according to claim 2 wherein said conveying means includes an end section adjacent said molding portion movable from a position spaced from said mold sections during rotation thereof to a position closely adjacent thereto when rotation ceases.

5. Mobile structural unit molding and assembling apparatus according to claim 2 wherein said unit transferring portion includes a plurality of conveying sections arranged in a generally end-to-end relationship.

6. Mobile structural unit molding and assembling apparatus according to claim 5 wherein said plurality of conveying means forms a substantially continuous path from said mold assembly to a unit placement position.

7. Mobile structural unit molding and assembling apparatus according to claim 5 wherein said conveying means includes means maintaining adjacent ends of conveying sections in close proximity and a separate tiltable conveying section remote from said molding portion including elevating means.

8. Mobile structural unit molding and assembling apparatus according to claim 1 wherein said unit transferring portion is pivotable with respect to said support portion.

9. Mobile structural unit molding and assembling apparatus according to claim 2 wherein said sensing means is disposed adjacent an end of said conveying means remote from said molding portion.

10. Mobile structural unit molding and assembling apparatus according to claim 1 wherein said control portion includes coordinating means automatically controlling said unit molding and assembly.

* * * * *